Patented July 2, 1946

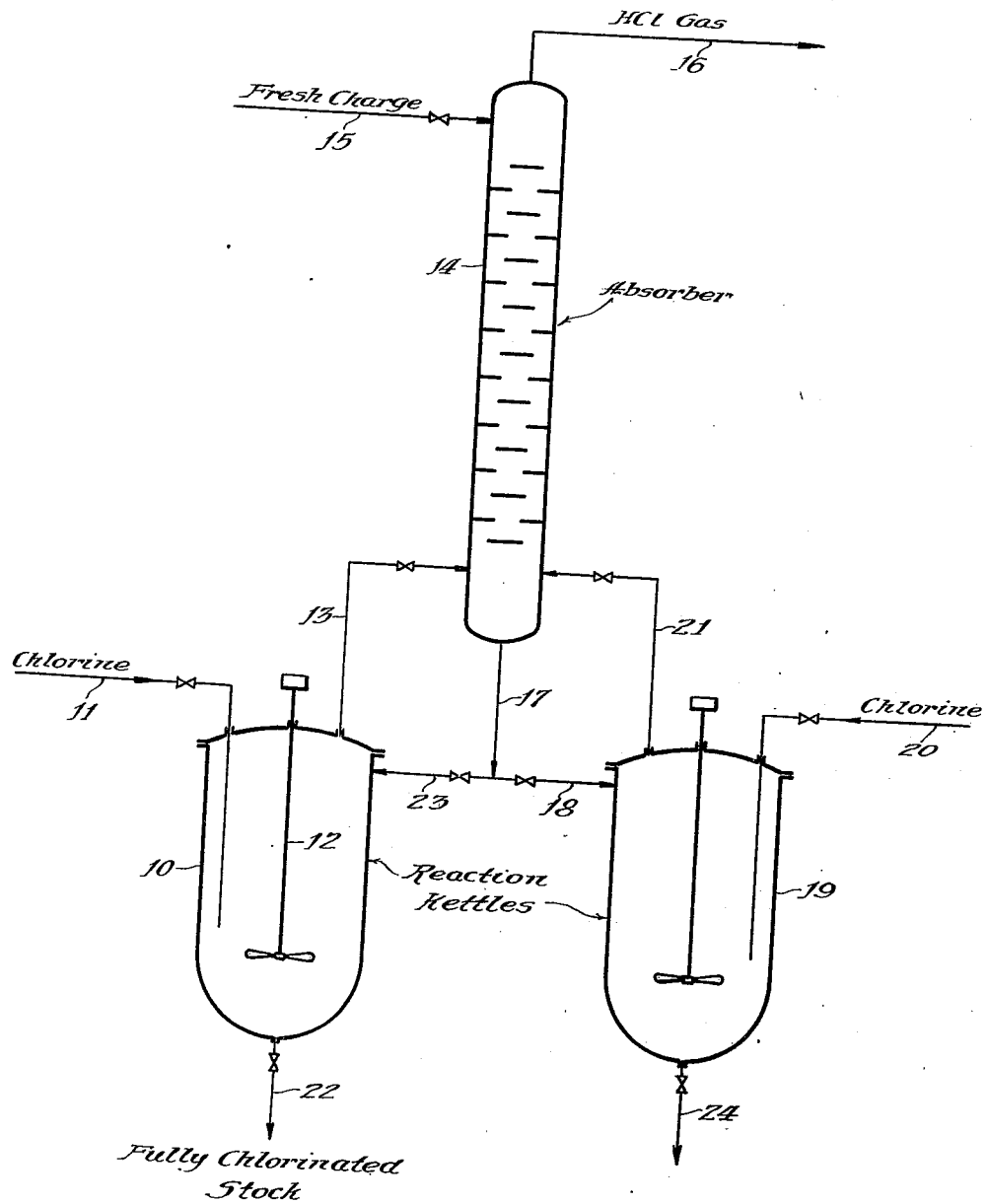

2,403,179

UNITED STATES PATENT OFFICE 2,403,179

CHLORINATION OF HYDROCARBON MIXTURES

Carl Max Hull and Edmond L. d'Ouville, Chicago, Ill., assignors to Standard Oil Company, Chicago, Ill., a corporation of Indiana Application November 20, 1942, Serial No. 466,287

4 Claims. (Cl. 204—163)

This invention relates to the process of chlorinating hydrocarbons and the chlorinated product derived therefrom. More particularly it relates to co-chlorination of paraffin wax and olefin polymers of ethylene, propylene and the butylenes. The polymers of propylene, particularly those obtained by a special method of polymerization described in application Serial No. 466,286, filed November 20, 1942, give particularly good results in our co-chlorination process.

One object of the invention is to prepare novel plastic chlorinated hydrocarbons whose characteristics can be varied over a considerable range not hitherto possible by varying the character and proportions of paraffin wax employed in the co-chlorination reaction. Another object of our invention is to effect the chlorination of paraffin and olefin polymers more smoothly than heretofore. Still another object of our invention is to introduce a high percentage of chlorine into olefin polymers without the use of a volatile solvent and without the necessity of separation from a solvent after the reaction. Yet another object of our invention is to obtain a higher chlorine absorption efficiency than heretofore. Other objects of our invention will be apparent from the following description thereof. The invention is illustrated by a drawing which shows diagrammatically one form of apparatus for carrying out the process.

In carrying out the process we may employ olefin polymers having a wide range of molecular weights but, in general, we prefer to use olefin polymers having molecular weights upwards of 800 or 1000. Molecular weights in the range of 1000 to 2500 are very satisfactory although the process is applicable to olefin polymers such as the isobutylene polymers prepared at low temperates by the action of boron fluoride or aluminum chloride with molecular weights of the order of 25,000 to 50,000 or higher, for example 100,000. Our invention applies particularly to olefin polymers resulting from the action of Friedel-Crafts catalysts on the light olefin hydrocarbons, anhydrous aluminum chloride being one of the most suitable catalysts for the purpose. Certain polymers, such as those of propylene hereinafter described, may be employed with molecular weights as low as 400 to 600.

Paraffin wax employed in the process may be the ordinary refined paraffin of commerce with a melting point generally within the range of about 120 to 145° F. or a less highly refined wax such as slack wax. The chlorination of paraffin wax by itself is generally complicated by the difficulty of obtaining sufficiently rapid chlorine absorption. When chlorinated in admixture with the olefin polymer, however, the rate of chlorine absorption is very rapid and we have discovered that the chlorine is almost evenly distributed between the wax and the olefin polymer. These facts indicate mutually beneficial effects from the chlorination of these two substances in admixture rather than individually. The rate of chlorine absorption is largely determined by the amount of cooling available for dissipating the exothermic heat of reaction and by the temperature of the reaction. Reaction temperatures of 100 to 300° F. are suitable, the temperature usually being held about 150 to 250° F.

Although it is not essential, we prefer to carry out the chlorination reaction in the presence of light. For this purpose a strong light having a frequency within the visible range and preferably about 4900 Angstrom units is desirable. Sunlight may be used as a source of actinic light for the reaction and it is also convenient to use the light from a mercury vapor lamp screened to remove the ultra-violet rays which promote decomposition or depolymerization of the hydrocarbons. The sun lamp known as G. E. Model S-1 or G. E. Model AH-1 is satisfactory. The lamp may be protected by a pyrex glass globe. It is preferred to conduct the reaction in glass-lined equipment to avoid contamination from iron which results in the formation of colored products. A glass enameled Pfaudler reaction kettle provided with a jacket for heating and cooling the reaction mixture is very satisfactory. Hydrochloric acid gas is produced as a by-product in the reaction and we may conduct off the gases containing unabsorbed chlorine through an absorber in contact with hydrocarbon charge, thereby absorbing additional chlorine and still further increasing chlorine absorption efficiency.

The percentage of paraffin in the mixture which we may employ generally is in the range of about 10 to 70 per cent by weight, depending on the character of the final product desired and the molecular weight of the polymer. We may also add a small amount of an organic amine to the reaction mixture, either before, during or after chlorination, to assist in preventing discoloration. About 0.01 to 1 per cent of an organic amine may be employed. For example 0.05 to 0.2 per cent of tributyl amine or triamyl amine is usually satisfactory. Additional amine may be added to the reaction product as a color improver and stabilizer.

When propylene polymer is employed we prefer to use the polymer made by passing a liquid propylene stream or C₃ fraction of cracking still gas containing propylene, upwardly through a reaction zone containing a fluid aluminum chloride catalyst. For this purpose the catalyst is essentially a liquid complex of anhydrous aluminum chloride and a hydrocarbon, preferably an olefin polymer. The temperature of polymerization is suitably maintained in the range of 30 to 200° F., generally about 60 to 100° F., and the catalyst is preferably activated by the introduction of hydrogen chloride. A feed stock containing about 20 to 25 per cent of propylene in propane is quite satisfactory. Sufficient pressure should be maintained to avoid vaporization. The polymer solution is withdrawn from the top of the reactor and passed through a bed of the filtering medium such as burnt spent clay and then stripped of propane. The resulting polymer is a colorless viscous oil with a molecular weight largely in the range of 500 to 1500. It may be dissolved without further stripping in melted paraffin and chlorinated. We prefer to strip the polymer, however, before chlorination by blowing it with steam or air at a moderate temperature, e. g. 210° F., to remove a small amount, for example 0 to 5 per cent, of relatively low boiling polymer which may cause color formation in the chlorinated product.

Referring to the drawing, one method of effecting the chlorination of olefin polymer-paraffin mixtures is as follows:

A charge of polymer and wax in the desired proportion is placed in chlorinating kettle 10 and chlorine is introduced at a regulated rate by induction line 11. Agitator 12 is put in operation and the gases from the reactor consisting mainly of HCl and Cl₂ pass off by line 13 leading to absorber 14. These gases pass upward through the absorber in counterflow to a stream of fresh charge of polymer and wax introduced at 15 and flowing down over baffles or bubble plates in the absorber. The chlorine in the gas is largely absorbed by the hydrocarbon charge, the temperature being maintained above the solidifying point of the charge and within the range conducive to rapid chlorination—e. g. about 150-250° F. Heat may be removed by a cooling jacket, coils or other suitable cooling means, not shown. HCl gas is discharged from the absorber by line 16.

Partially chlorinated feed stock flows from the base of tower 14 by lines 17 and 18 leading to reaction kettle 19. The rate of charging is regulated so that the kettle 19 is filled at the time the charge in kettle 10 is chlorinated to the desired point. The stream of chlorine is then cut off at line 11 and started through line 20 leading into kettle 19. The gases from 19 pass by line 21 to absorber 14 where chlorine is absorbed by fresh feed stock as previously described.

The fully chlorinated stock in 10 which may contain 30 to 75 per cent but usually contains about 40 to 60% chlorine is withdrawn by line 22, preferably after sweeping with nitrogen. Fresh charge from tower 14 is then passed into kettle 10 through line 23, the valve in line 18 being closed. By operating in this manner, using fresh charge to absorb chlorine from the gases from the reaction kettles countercurrently, a high chlorine absorption efficiency is obtained. This method is especially effective in absorbing chlorine because the efficiency of chlorination of the fresh feed polymer stock is very high, sometimes exceeding 100 per cent of the theoretical for substitution due to the fact that some of the chlorine reacts by addition.

As an example of the operation of our process, a charge of 120 pounds of propylene polymer and 80 pounds of paraffin wax, melting point 132° F. ASTM, was mixed with 0.1 per cent of tributyl amine and chlorinated in the light of a sun lamp identified as G. E.-model AH-1. During the introduction of the first 50 pounds of chlorine the temperature of the reaction vessel was held at 200° F. by controlling the rate of chlorine addition and the rate of cooling. Later the temperature was allowed to rise to 250° F. The product had a yellow color and contained 50.1 per cent of chlorine. From the weight of chlorine employed and the amount of chlorine in the product, the chlorine absorption efficiency was determined to be 77.3 per cent. The product was blown with nitrogen to remove HCl gas and run directly into a drum where it solidified. Chlorination time was forty-six hours. In another run on the same charge at 255° F. and without illumination, the chlorine absorption efficiency was 67.5 per cent. The time required for this reaction was thirty-six hours and the product produced contained about 50 per cent chlorine and had a specific gravity of about 1.32.

In another example a mixture of equal weights of propylene polymer having a viscosity of about 55 Saybolt Universal at 210° F. and paraffin wax, 132° F. melting point, was chlorinated in the presence of light from a tungsten filament lamp. The temperature of the reaction rose rapidly to 200° F. and was maintained between 200 and 250° F. by regulating the rate of introducing chlorine. After about fifteen hours the reaction was stopped and the product cooled to room temperature. It was a honey colored, sticky, semi-solid resin which analysis showed to contain 48 per cent of chlorine. In the absence of paraffin the propylene polymer with this amount of chlorine introduced would have been a brittle solid free from tackiness.

In another example, 158 parts of the same propylene polymer and an equal amount of the same paraffin wax were mixed with 0.4 parts of triamyl amine and chlorinated substantially without cooling. The temperature rose to 315° F. The yield of product was 600 parts corresponding to the reaction of 47 per cent of the chlorine introduced. The product was a reasonably fluid oil at the reaction temperature but on cooling to room temperature it became a semi-solid material. The color was darker than that obtained when chlorinated below 250° F.

In another example, 57.2 parts of a propylene polymer having a viscosity of 64 Saybolt Universal at 210° F. and an equal weight of paraffin, 132° F. melting point, was mixed with 0.1 part of triamyl amine and chlorinated at a temperature of 200 to 280° F. in the pressure of light from a tungsten filament lamp. When the chlorine content of the product reached 44 per cent the reaction was stopped. The product at room temperature was a yellow colored, very viscous oil.

The product of our process may be made to vary considerably in its physical properties depending on the extent of chlorination and the relative proportions of wax to olefin polymer. As indicated hereinabove the preferred composition contains from 40 to 60 per cent chlorine. Such a product is an excellent composition for the water-proofing and vermin-proofing of canvas employed in tent fabrics, tarpaulins, etc. A similar composition is an excellent impregnating agent in the so-called cravenetting process for garments. These highly chlorinated hydrocarbon materials confer fire resistance to fabrics to which they are applied. The co-chlorinated paraffin-olefin polymer product is thoroughly homogeneous showing no tendency to separate under various conditons, for example on frequent melting and resolidification. Among the many other uses for our product of chlorination may be mentioned impregnation of wood, surface coating of wood and metals, impregnation of paper and lamination with paper for use in wrapping and carton manufacture, etc. Products which are viscous liquids or semi-solids are also useful as adhesives, as addition agents for lubricating oils, cutting oils and other special petroleum products and as plasticizing agents in various materials including rubber, plastics, paint and varnish resins, and the like.

Having thus described our invention what we claim is:

1. The process of preparing a chlorinated hydrocarbon plastic by chlorination of hydrocarbons in the substantial absence of volatile solvents which comprises dissolving in a melted paraffin wax a propylene polymer having a molecular weight above 800, said wax constituting 10 to 70 per cent of the resulting mixture, introducing chlorine into the hydrocarbon mixture at a temperature of about 100 to 300° F. whereby the chlorine is rapidly absorbed in the hydrocarbon mixture and the polymer and paraffin are evenly chlorinated, and continuing the introduction of chlorine until the concentration of chlorine in the product reaches 40 to 75 per cent by weight thereof.

2. The process of claim 1 wherein the development of color-producing components is inhibited in said hydrocarbon mixture during chlorination by adding a small amount of an organic amine thereto.

3. The process of claim 1 which comprises conducting the chlorination reaction in the presence of actinic light.

4. In the process of chlorinating paraffin wax, the method of increasing the rate of chlorination which comprises preparing a homogeneous melt of said wax and at least 30 per cent of a propylene polymer having a molecular weight above 800, introducing chlorine into the resulting melt at a temperature of 100 to 300° F. in the presence of actinic light whereby chlorine is rapidly and evenly absorbed by both the paraffin and the polymer and continuing the introduction of chlorine until the chlorinated product contains about 40 to 75 per cent of chlorine by weight.

CARL MAX HULL.
EDMOND L. d'OUVILLE.